United States Patent [19]
Roerty et al.

[11] Patent Number: 5,862,946
[45] Date of Patent: Jan. 26, 1999

[54] GAS DISSOLUTION UNDER PRESSURE

[75] Inventors: Cynthia Elizabeth Roerty, Macungie, Pa.; Julia Man-Lai Hara, Cupertino, Calif.

[73] Assignee: Air Products and Chemicals, Inc., Allentown, Pa.

[21] Appl. No.: 891,313

[22] Filed: Jul. 10, 1997

Related U.S. Application Data

[60] Provisional application No. 60/021,676 Jul. 12, 1996.
[51] Int. Cl.[6] .................................................... B67D 5/08
[52] U.S. Cl. ........................... 222/1; 137/3; 137/87.02; 137/211.5; 222/56; 222/61; 222/64
[58] Field of Search .................................... 222/1, 56, 61, 222/64; 137/3, 9, 87.02, 98, 211.5

[56] References Cited

U.S. PATENT DOCUMENTS

| 2,839,001 | 6/1958 | Tubbs | 137/211.5 |
|---|---|---|---|
| 4,002,268 | 1/1977 | McKinney | 222/1 |
| 4,106,671 | 8/1978 | Sharples | 222/61 |
| 4,823,987 | 4/1989 | Switall | 222/64 |
| 5,148,945 | 9/1992 | Geatz | 222/1 |
| 5,330,072 | 7/1994 | Ferri, Jr. et al. | 222/1 |
| 5,332,125 | 7/1994 | Schmitkons et al. | 222/1 |
| 5,370,269 | 12/1994 | Bernosky et al. | 222/61 |
| 5,383,574 | 1/1995 | Raphael | 222/1 |
| 5,417,346 | 5/1995 | Ferri, Jr. et al. | 222/61 |
| 5,429,276 | 7/1995 | Esclar et al. | 222/136 |
| 5,490,611 | 2/1996 | Bernosky et al. | 222/1 |
| 5,771,917 | 6/1998 | Carney et al. | 222/64 X |

Primary Examiner—Stephen M. Hepperle
Attorney, Agent, or Firm—Geoffrey L. Chase

[57] ABSTRACT

The present invention is directed to precise, accurate mixing two or more chemicals in a metered vessel to achieve a precise, accurate concentration of the chemicals. More particularly, the chemicals are mixed in a vessel having constricted vent tubes with level sensors to precisely and accurately determine the volume of chemical introduced into the vessel. Most specifically, the vessel is closed so that the introduction of the chemicals increases the vessel pressure to enhance the mixing of the chemicals, decrease turbulence and enhance the accuracy of the level sensors.

10 Claims, 1 Drawing Sheet

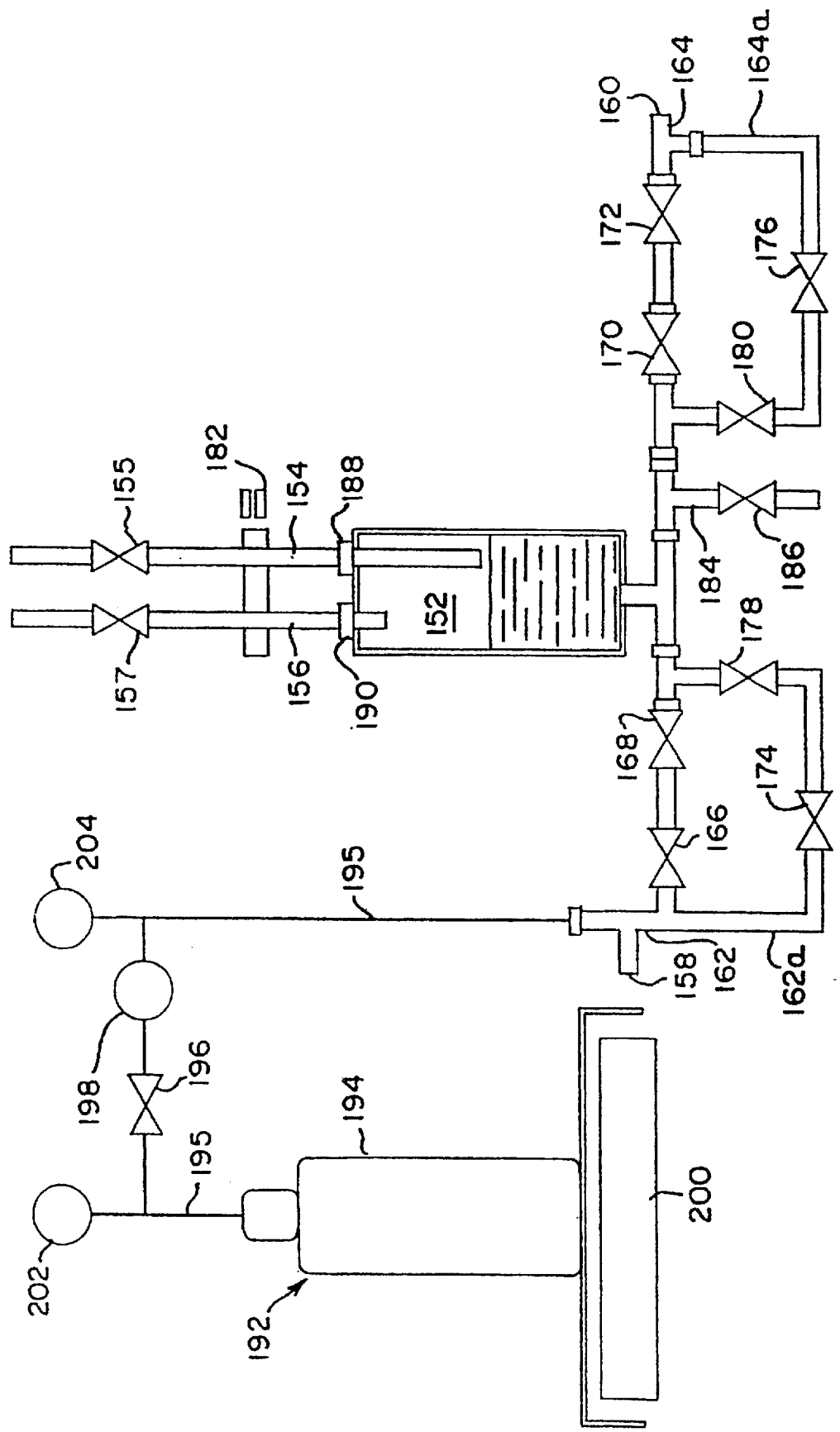

5,862,946

GAS DISSOLUTION UNDER PRESSURE

CROSS-REFERENCE TO RELATED APPLICATIONS

The present application claims the benefit of copending provisional patent application Ser. No. 60/021,676 filed 12 Jul. 1996.

BACKGROUND OF THE INVENTION

Precise mixing of chemicals, particularly gases in liquids, has been a desire of the chemical industry. The semiconductor industry has sought precise dilutions or concentrations of chemical mixtures due to its demanding requirements for purity and concentration in the fabrication of semiconductor materials of construction.

U.S. Pat. Nos. 4,002,268; 5,332,125; 5,383,574 and 5,429,276 are directed to mixing of chemicals in general in the chemical industry.

U.S. Pat. Nos. 5,148,945; 5,330,072 and 5,417,346 are directed to mixing of chemicals in the chemical industry and more particularly precise mixing for the semiconductor industry.

U.S. Pat. Nos. 5,370,269 and 5,490,611 are relevant to precise mixing of chemicals for the chemical and semiconductor industry using metered vessels and constricted vent tubes with level sensors to achieve the precise mixing and dilution requirements of the semiconductor industry. Unfortunately, they suffer from slow mixing rates and false readings from the level sensors under desired mixing rates.

The present invention overcomes the drawbacks of the prior art to provide precise and accurate mixing, dilution and concentrations of chemicals at rapid rates and without false or premature signals from level sensors in a metered vessel using constricted vent tubes, as will be more fully set forth below.

BRIEF SUMMARY OF THE INVENTION

The present invention is a method for accurately mixing chemicals in a metered vessel comprising the steps of:

a) providing a metered vessel having one or more inlets for chemicals to be mixed, a plurality of constricted vent tubes each having level sensing means and a means to control venting of said metered vessel;

b) introducing a first chemical into said metered vessel through said one or more inlets to provide a predetermined accurate volume of said first chemical wherein said first chemical's introduction is stopped when its level rises in a first of said plurality of constricted vent tubes to the point of said level sensing means generating a signal from said level sensing means;

c) introducing at least a second chemical into said metered vessel through said one or more inlets to provide a predetermined accurate volume of said at least second chemical wherein said second chemical's introduction is stopped when its level rises in another of said plurality of constricted vent tubes to the point of said level sensing means generating a signal from said level sensing means; and d) simultaneous to introducing said at least second chemical into said metered vessel, maintaining said means to control venting at least partially closed at least during a portion of said introducing said at least second chemical to raise the pressure in said metered vessel.

Preferably, simultaneous to introducing said first chemical into said metered vessel, maintaining said means to control venting in said first constricted vent tube open to maintain ambient pressure in said metered vessel.

Preferably, the first chemical is a liquid at room temperature.

Preferably, the second chemical is a gas at room temperature.

Preferably, each chemical is introduced through a separate inlet into the metered vessel.

Preferably, the first chemical is water.

Preferably, the second chemical is selected from the group consisting of ammonia, hydrogen chloride and hydrogen fluoride.

Preferably, the metered vessel has a pressure relief valve means to vent the metered vessel in the event the pressure of the mixing chemicals approaches a predetermined pressure level, less than the pressure rating of the mixing vessel.

Preferably, the metered vessel has at least one level sensing means and each constricted vent tube has at least one level sensing means.

Preferably, chemical is introduced at a first rate of introduction until it reaches a level sensor in said metered vessel and is introduced at a second slower rate of introduction until it reaches a second level sensor in said constricted vent tube.

BRIEF DESCRIPTION OF THE DRAWING

The drawing is a schematic depiction of an apparatus in which the present invention can be performed.

DETAILED DESCRIPTION OF THE INVENTION

As described above, the mixing of two or more chemicals, such as a gas in a liquid to provide a mixture, dilution or specific concentration of the chemical has been problematic. The chemical industry and more particularly the semiconductor portion of the chemical industry has a significant demand for low cost, high purity, precise concentration chemical mixtures which have heretofore been difficult to obtain. The present invention improves upon the technology set forth in U.S. Pat. Nos. 5,370,269 and 5,490,611, the entire contents of which are hereby incorporated by reference in their entirety herein. Those patents describe a mixing apparatus and process wherein a metered vessel having a precise volumetric dimension utilize inlets for several chemicals and constricted vent tubes at the top of the metered vessel at different and variable heights so as to provide a volumetrically precise amount of each chemical as it was added to the vessel.

The difficulty with the technology of those prior art patents is that in mixing a liquid and a gas, the prior art patents describe the constricted vent tubes being open to atmosphere or at least open to a space outside the metered vessel, such that an unpressurized condition exists within the metered vessel during the mixing process. The lack of any pressure above atmospheric pressure in the metered vessel caused gaseous chemical being introduced into previously admitted liquid chemical to bubble and provide turbulence at the upper liquid level of the liquid chemical such that false or premature readings on the level sensing devices in the constricted vent tubes occurred. Additionally, gaseous chemical being introduced to the liquid chemical in the metered vessel of the prior art frequently passed through the liquid without sufficient dissolution and exited through the constricted vent tubes which were open to an external space. This resulted in loss of valuable gaseous chemical and poor mixing and dissolution, with gaseous chemical collecting in disproportionate amounts in the head space of the metered vessel.

The present invention improves upon mixing of two or more chemicals, such as a gas and a liquid, in a metered precise volume vessel using constricted vent tubes and level sensing means for precise and accurate volumetric additions, by restricting the constricted vent tube such that the metered vessel in which the mixing of the chemicals takes place becomes pressurized as chemical is added to the metered vessel. Increased pressure in the metered vessel slows the passage of gaseous chemical bubbles from the inlet of the metered vessel near the base of the vessel to the head space and constricted vent tubes at the top of the metered vessel so that the gaseous chemical is more readily dissolved in the liquid chemical. The increased pressure also enhances the dissolution rate of gaseous chemical into the liquid chemical. Because the pressure increase in the closed vessel reduces the action of gaseous chemical (bubbling up to the surface of the liquid chemical), turbulence at the liquid surface level of the chemical, particularly as it rises into the constricted vent tubes near the level sensing means, is minimized so that more accurate level sensing is achieved with less false or premature level sensing signaling.

The enhanced dissolution of gaseous chemical into the liquid chemical and the diminishment of turbulence at the liquid chemical level in the metered vessel, particularly in the constricted vent tube near the level sensing means, allows for chemical introduction rates and mixing rates in excess of what the prior art was capable of achieving. The result is precise, accurate chemical mixing, dilution or concentrations with rapid production in excess of what was achieved by the prior art in light of the use of pressurizing conditions in the chemical introduction and mixing process using a metered volumetric vessel with constricted vent tubes and level sensing means.

The constricted vent tubes utilized in the method of the present invention provide the opportunity for accurate and automatic volume or level sensing in contrast to mixing vessels not having such apparatus, because of the volumes necessary to reach predetermined levels of chemical in the metered vessel.

The theory of operation of the constricted vent tubes of the present invention can be better understood with reference to the drawing. As is illustrated, a reliable yet relatively low cost sensor 182 might have an effective "bandwidth" of about ½ inch. Mounting such a sensor on a container 152 having a volume of $V_w$, the range of error of the sensor 182 would comprise the volume $V_w$ (i.e. the volume occupied by a ½" of chemical across the entire diameter of container 152).

In contrast, by employing the same type of sensor 182, with the exact same ½" bandwidth, on a constricted vent tube 154 or 156, the range of error is greatly reduced. In this instance, the range of error is only the volume $V_n$ (i.e. the volume occupied by a ½" of chemical across the much smaller diameter of the vent tube 154 or 156). Since the volume $V_n$ is insignificant relative to the volume $V_w$, this simple modification of the metered vessel provides vastly improved accuracy to the process of filling the vessel without the need of introducing more expensive (and generally less reliable) sensors having narrower bandwidths.

Mixing dilution and obtaining desired concentrations of chemicals in an automatic procedure is enhanced by the use of constricted vent tubes for the reasons described above. However, the operation and utilization of constricted vent tubes in a mixing vessel can be greatly enhanced using the pressurization procedure of the present invention particularly for gas and liquid mixtures. The mixing procedure will be described in greater detail with regard to the drawing for a preferred embodiment to the present invention using the introduction of a liquid chemical first with a gaseous chemical subsequently added into a metered vessel.

A preferred embodiment of the diluter/mixer of the present invention is illustrated in the drawing. In this form, only a single metered vessel 152 is used for combination of chemicals from two or more sources. Multiple constricted vent tubes 154, 156 are included in the metered vessel 152, each corresponding with one of the chemical sources and each oriented at a different height. To control the flow of fluid through the vent tubes 154, 156, each is provided with a shut-off valve 155, 157, respectively.

Chemical is supplied to the metered vessel 152 from two or more chemical inlets 158, 160 along intake lines 162, 164. Each of the intake lines 162, 164 can be attached to the metered vessel 152 via separate connections, or by a single junction, as shown. Each of the intake lines 162, 164 is provided with valves 166, 168, 170, 172 to control the flow of chemical therethrough. Additionally, alternative flow paths may be provided via intake lines 162a, 164a to deliver chemical at a reduced flow rate through valves 174, 176 and adjustable constrictions 178, 180.

In operation, chemical is delivered to the metered vessel 152 from a first chemical source along a first intake line 164 until vent tube 154 is reached. By operating with vent tube valve 155 open and vent tube valve 157 closed, once vent tube 154 is reached the chemical flow will proceed up the vent tube 154 until sensor 182 is attained. Chemical flow is then shut off from the first intake line 164. At this stage, valve 157 is opened and valve 155 remains open (allowing chemical to drain from vent tube 154 into the metered vessel 152).

Chemical is next delivered to the metered vessel 152 from a second chemical source along second intake line 162 until vent tube 156 is reached. Valve 155 is closed and constricted vent tube 156 is restricted either by at least partially closing valve 157 or by the use of a pressure controlling component or means to control venting (such as a shut-off valve, back pressure regulator, safety relief valve, pressure relief valve, check valve or comparable closeable control device), so that the pressure rises in metered vessel 152 commensurate with the volume occupied by the chemical. Again, chemical flow will proceed up vent tube 156 until chemical flow is ceased when sensor 182 is reached. It should be noted that to assist in minute adjustments of the amount of each chemical component, it may be desirable to provide a separate sensor on each of the vent tubes, each being independently vertically adjustable. Once the vessel 152 is filled and the chemicals have been thoroughly mixed, the blended chemical can then be discharged to any desired location via dispense line 184 and valve 186 motivated by any suitable means, including gravity or pressure. Because the metered vessel has been restricted during at least a portion of the introduction and mixing of chemicals, the pressure in the vessel rises commensurate with the volume of chemical. Where a gas is added to a liquid, the gas is more readily dissolved in the liquid under pressure and the gas bubbles ascend from the inlet to the vent tubes more slowly, enhancing dissolution. Because the gas ascends more slowly, less bubbling and turbulence occurs at the liquid surface and the level sensors 182 provide more accurate sensing. Chemical can be added at a more rapid rate without false sensing.

The present invention has been described with regard to one preferred embodiment. However, other alternative utilizations of the present invention using the pressurization during mixing or chemical introduction are possible.

Another option with this embodiment is that it easily lends itself to combining chemicals from many different sources. As should be evident, many different chemicals can be mixed using this method by simply adding an addition vent tube at a different level for each chemical to be included and connecting to additional chemical inlets. As is known, it is often desirable to provide for the combination of liquid (non-compressible fluid) and gas (compressible fluid) to generate a desired chemical. For instance, combination of ultra-pure water ($H_2O$) with anhydrous ammonia ($NH_3$) gas produces ammonium hydroxide ($NH_4OH$); combination of ultra-pure water with anhydrous hydrofluoric (HF) gas produces aqueous HF; combination of ultra-pure water with anhydrous hydrochloric (HCl) gas produces aqueous HCl. All of these end products are common chemicals used in the semiconductor industry.

As illustrated, such chemical generation is accomplished by using a gas system 192 in communication with one of the intake lines 162. Gas is supplied from a gas storage tank 194 through gas line 195 to intake line 162. Flow through the gas line 195 is controlled by valve 196 and pressure regulator 198. To monitor the presence and amount of gas in the gas system 192, a scale 200 may be provided to track the weight of the tank 194 and various pressure gauges 202, 204 can be provided on the gas line.

As should be evident from this discussion, any number of either liquid or gaseous chemical components may be combined in this manner for mixing of chemicals and/or chemical generation.

It should be likewise understood that the use of the term "chemical" herein is intended to cover any chemical element or composition, including gaseous, liquid and solid suspensions, which can be handled by the apparatus of the present invention, including water. Accordingly, the use of the terms "mixing" and "diluting" are intended to be used interchangeably to describe the combination of chemicals from different sources.

As can be appreciated, the process of the present invention is particularly amenable to a soluble process gas being dissolved into a liquid chemical. As process gas dissolves into solution thereby increasing the solution volume and raising its level in the metered vessel, the restriction of the constricted vent tube controls the venting of the vapor space above the solution such that the vapor space is compressed and it's pressure rises to an elevated level that is still within the pressure rating of the metered vessel. This positive pressure aids in the dissolution of the process gas into the chemical thereby reducing both process gas losses and surface turbulence which in turn increases the accuracy of the liquid level measurement as well as the accuracy of the mixing. The process of the present invention is superior to processes for mixing chemicals i the prior art because the elevated pressure allows the present invention to achieve high process gas flow rates, which translates to high chemical generation capacity, while still maintaining low process gas losses, low surface turbulence, and high mixing accuracy. The prior art, when run with high process gas flow rates, suffered from high process gas losses, high turbulence, and low mixing accuracy.

The constricted vent tube must be provided with a restriction to control the venting of the vapor space to a safe venting location. This restriction may be an isolation valve, a back pressure regulator, a check valve, a pressure relief valve, a shut-off valve or other closeable control device. Additionally, a port in communication with the vapor space of the vessel can be provided in order to give the compressed vapor a means to exit the vessel if the pressure exceeds the pressure rating of the vessel for any reason. This vapor space port must have a means for opening the vessel to a safe venting location as well as a means for partially or totaling restricting the vapors path to the venting location. The opening and restriction of this vapor port may be accomplished via numerous components. For example, isolation valves, check valves, safety or pressure relief valves, and other components may be used on the vapor port. The opening and closing of the select component on the vapor port may be controlled in multiple ways. Vessel pressure, solution level or volume, time, and numerous properties of the chemical such as conductivity, pH and density are some of the process variables that may be monitored and used to control the vapor port component. This vapor port or pressure relief function may be discrete from the means to control venting or accomplished by the same means or device, such as valve 157.

In summary, the present invention is superior than the prior art and achieves objectives beyond what the prior art is able to accomplish because the pressurization of the mixing vessel increases the solubility of the process gas as the pressure increases. This increased solubility means a stronger driving force for the gas to go into solution resulting in less gas remaining undissolved. In addition, the higher process pressure slows down the rate at which undissolved gas bubbles travel up to the chemical surface. The resulting increased contact time between the process gas and the chemical increases the percentage of gas that gets dissolved into the liquid chemical. This results in less surface turbulence at the liquid level of the chemical in the metered vessel and thus diminishes the chances that false or premature readings of a level sensing means or device particularly in the constricted vent tube would occur. The result is minimal process gas losses during high gas flow rates resulting in a faster, smoother and more economical and environmentally desired mixing process for chemicals.

Although the preferred embodiment and much of the discussion focused on the mixing of a liquid chemical and a gaseous chemical, it can be appreciated that various chemicals in various physical states may be mixed with the process of the present invention.

We claim:

1. A method for accurately mixing chemicals in a metered vessel comprising the steps of:

a) providing a metered vessel having one or more inlets for chemicals to be mixed, a plurality of constricted vent tubes each having level sensing means and means to control venting of said metered vessel;

b) introducing a first chemical into said metered vessel through said one or more inlets to provide a predetermined accurate volume of said first chemical wherein said first chemical's introduction is stopped when its level rises in a first of said plurality of constricted vent tubes to the point of said level sensing means generating a signal from said level sensing means;

c) introducing at least a second chemical into said metered vessel through said one or more inlets to provide a predetermined accurate volume of said at least second chemical wherein said second chemical's introduction is stopped when its level rises in another of said plurality of constricted vent tubes to the point of said level sensing means generating a signal from said level sensing means; and d) simultaneous to introducing said at least second chemical into said metered vessel, maintaining said means to control venting at least partially closed at least during a portion of said introducing said at least second chemical to raise the pressure in said metered vessel.

2. The method of claim 1 wherein simultaneous to introducing said first chemical into said metered vessel, maintaining said means to control venting in said first constricted vent tube open to maintain ambient pressure in said metered vessel.

3. The method of claim 1 wherein the first chemical is a liquid at room temperature.

4. The method of claim 1 wherein the second chemical is a gas at room temperature.

5. The method of claim 1 wherein each chemical is introduced through a separate inlet into the metered vessel.

6. The method of claim 1 wherein the first chemical is water.

7. The method of claim 1 wherein the second chemical is selected from the group consisting of ammonia, hydrogen chloride and hydrogen fluoride.

8. The method of claim 1 wherein the metered vessel has a pressure relief valve means to vent the metered vessel in the event the pressure of the mixing chemicals approaches a predetermined pressure level, less than the pressure rating of the mixing vessel.

9. The method of claim 1 wherein the metered vessel has at least one level sensing means and each constricted vent tube has at least one level sensing means.

10. The method of claim 1 wherein chemical is introduced at a first rate of introduction until it reaches a level sensor in said metered vessel and is introduced at a second slower rate of introduction until it reaches a second level sensor in said constricted vent tube.

* * * * *